(12) United States Patent
Cai et al.

(10) Patent No.: US 10,015,070 B1
(45) Date of Patent: Jul. 3, 2018

(54) SYSTEMS AND METHODS FOR EXTENDING A HANDOVER TRIGGER POINT FOR A WIRELESS DEVICE OPERATING IN A CONNECTED MODE

(71) Applicant: Sprint Spectrum LP, Overland Park, KS (US)

(72) Inventors: Zheng Cai, Fairfax, VA (US); Zheng Fang, McLean, VA (US); Roger Bartlett, Merriam, KS (US); Yu Wang, Herndon, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 59 days.

(21) Appl. No.: 15/195,077

(22) Filed: Jun. 28, 2016

(51) Int. Cl.
| | | |
|---|---|---|
| *H04W 52/18* | (2009.01) | |
| *H04L 12/26* | (2006.01) | |
| *H04W 36/24* | (2009.01) | |
| *H04W 36/16* | (2009.01) | |

(52) U.S. Cl.
CPC .............. *H04L 43/16* (2013.01); *H04W 36/16* (2013.01); *H04W 36/24* (2013.01)

(58) Field of Classification Search
None
See application file for complete search history.

(56) References Cited

U.S. PATENT DOCUMENTS

| | | | | |
|---|---|---|---|---|
| 8,320,307 B2 * | 11/2012 | Niwano | .............. | H04W 52/346 370/318 |
| 9,055,544 B2 | 6/2015 | Worrall et al. | | |
| 9,078,220 B2 | 7/2015 | Makhlouf et al. | | |
| 9,332,505 B2 * | 5/2016 | Siomina | ................ | H04W 52/18 |
| 9,554,367 B1 * | 1/2017 | Liu | ......... | H04W 36/16 |
| 9,635,582 B2 * | 4/2017 | Kusano | ................. | H04W 28/08 |
| 9,713,047 B2 * | 7/2017 | Huang | ............. | H04W 36/0083 |
| 2011/0211560 A1 * | 9/2011 | Yamamoto | ............ | H04W 36/20 370/332 |
| 2013/0010720 A1 * | 1/2013 | Lohr | ..................... | H04L 1/0026 370/329 |
| 2013/0072259 A1 * | 3/2013 | Kusano | ................. | H04W 28/08 455/561 |
| 2013/0109389 A1 * | 5/2013 | Olofsson | ........... | H04W 36/0083 455/436 |
| 2013/0210435 A1 * | 8/2013 | Dimou | .............. | H04W 36/0083 455/436 |
| 2013/0223403 A1 * | 8/2013 | Chen | ................. | H04W 36/0083 370/331 |
| 2013/0250875 A1 * | 9/2013 | Chen | .................. | H04W 52/365 370/329 |
| 2013/0324182 A1 * | 12/2013 | Deng | .................. | H04W 52/281 455/522 |

(Continued)

*Primary Examiner* — Jay P Patel

(57) ABSTRACT

Systems and methods are described for extending coverage of a wireless device. A handover trigger threshold may be established for a plurality of wireless devices located in a coverage area of an access node. An attachment request may be received at the access node from at least one wireless device having a power class different from a common power class of the plurality of wireless devices. Based on the reported power class, the access node may adjust a handover trigger threshold for the at least one wireless device. The access node may instruct the at least one wireless device to extend its coverage until the adjusted handover trigger threshold is met.

19 Claims, 8 Drawing Sheets

(56) References Cited

U.S. PATENT DOCUMENTS

| | | | | |
|---|---|---|---|---|
| 2014/0274049 A1* | 9/2014 | Singh | ................ | H04W 36/0083 |
| | | | | 455/436 |
| 2014/0286219 A1* | 9/2014 | Siomina | ............... | H04J 11/0023 |
| | | | | 370/311 |
| 2015/0004975 A1* | 1/2015 | Yamamoto | ............ | H04W 36/30 |
| | | | | 455/436 |
| 2015/0119040 A1* | 4/2015 | Amirijoo | .............. | H04W 36/24 |
| | | | | 455/436 |
| 2015/0173017 A1* | 6/2015 | Rakotoharison | ........ | H04W 8/08 |
| | | | | 370/311 |
| 2015/0195762 A1* | 7/2015 | Watanabe | ......... | H04W 36/0083 |
| | | | | 455/436 |
| 2016/0066223 A1* | 3/2016 | Sawhney | .......... | H04W 36/0083 |
| | | | | 455/436 |
| 2016/0286442 A1* | 9/2016 | Huang | ................. | H04W 36/16 |
| 2016/0323788 A1* | 11/2016 | Nanri | .................... | H04W 36/04 |
| 2016/0353342 A1* | 12/2016 | Futaki | ................... | H04W 4/005 |
| 2017/0055224 A1* | 2/2017 | Boccardi | ............. | H04W 28/08 |
| 2017/0150408 A1* | 5/2017 | Joseph | .............. | H04W 36/0083 |

\* cited by examiner

SYSTEMS AND METHODS FOR
EXTENDING A HANDOVER TRIGGER
POINT FOR A WIRELESS DEVICE
OPERATING IN A CONNECTED MODE

TECHNICAL BACKGROUND

As cellular networks develop, cell sites will need time to reach targeted coverage levels. In the meantime, higher-power User Equipment (HPUEs) may be used for range extension in rural deployments and to enhance coverage in suburban/urban areas. Disadvantageously, there are Uplink (UL) interference concerns if HPUEs are deployed in areas where an access node density was designed for lower-power User Equipment (LPUEs) coverage; HPUEs will reach a Maximum Output Power (MOP) before it is necessary from a range extension perspective. While this improves throughput for the HPUE, UL interference noise rises and degrades UL performance overall from a system perspective.

For example, the 3$^{rd}$ Generation Partnership Project Long Term Evolution (3GPP LTE) specifies User Equipment (UE) Power Classes in 3GPP TS 36.101 Technical Specification Group Radio Access Network; Evolved Universal Terrestrial Radio Access (E-UTRA); UE radio transmission and reception (i.e., Release 8, December 2008; Release 9, December 2009; Release 10, March 2011; Release 11, September 2012; Release 12, September 2014; and Release 13, December 2015), the contents of which are incorporated by reference herein. While off-the-shelf UEs (e.g., Power Class 3 UEs) often transmit (Tx) at a Maximum Output Power (MOP) of +23 dBm, in Release 11 of the LTE standard, 3GPP proposed HPUEs able to Tx at a higher MOP of +31 dBm for low-band Frequency Division Duplex (FDD) spectrum, for example, to boost coverage in rural deployments and/or enhance throughput in suburban/urban areas. But, networks often neglect UE Power Class differences between HPUEs and other LPUEs, triggering handoff of HPUEs based on parameters set for LPUEs. Consequently, HPUE capabilities are not fully exploited and coverage/extension gains are unnecessarily limited. In addition, overall UL performance, for example, from a system perspective, may be degraded.

Overview

Systems and methods are described for extending coverage of a wireless device are disclosed. In one instance, mobility handoff parameters for a plurality of wireless devices may be set based on a lower power class device operating in a coverage area of an access node. A power report may be received at the access node from at least one wireless device of the plurality of wireless devices. A pathloss change may be calculated for the at least one wireless device based on the received power report. Based on the power report, calculated pathloss change, and set mobility handoff parameters, a handoff trigger point for the at least one wireless device may be adjusted.

In another instance, at least one wireless device operating in a coverage area of an access node may be instructed to report a power class at the access node. A power class delta for the at least one wireless device may be calculated at the access node. The power class delta may be calculated based on a difference of the reported power class of the at least one wireless device and a power class of a lower power class wireless device operating in the coverage area. The calculated power class delta may be applied to a set mobility handoff parameter. A handoff trigger point for the at least one wireless device may be adjusted based on the set mobility handoff parameter.

In another instance, a handover trigger threshold for a plurality of wireless devices located in a coverage area of an access node may be established. The handover trigger threshold may be established based on a common power class of the plurality of wireless devices. An attachment request may be received at the access node from at least one wireless device having a power class different from the common power class. Based on the reported power class, the handover trigger threshold for the at least one wireless device may be adjusted. The at least one wireless device may be instructed to extend its coverage until the adjusted handover trigger threshold is met.

DETAILED DESCRIPTION

As cellular networks develop, cell sites will need time to reach targeted coverage levels. In the meantime, higher-power User Equipment (HPUEs) may be used for range extension in rural deployments and to enhance coverage in suburban/urban areas. Disadvantageously, there are Uplink (UL) interference concerns if HPUEs are deployed in areas where an access node density was designed for lower-power User Equipment (LPUEs) coverage; HPUEs will reach a Maximum Output Power (MOP) before it is necessary from a range extension perspective. While this improves throughput for the HPUE, UL interference noise rises and degrades UL performance overall from a system perspective.

In operation, the 3$^{rd}$ Generation Partnership Project Long-Term Evolution (3GPP LTE) specifies User Equipment (UE) Power Classes in 3GPP TS 36.101 Technical Specification Group Radio Access Network; Evolved Universal Terrestrial Radio Access (E-UTRA); UE radio transmission and reception. For example, 3GPP defines uplink (UL) transmit Power Classes and tolerances (i.e., power error limits) for UEs at section 6.2.2 of 3GPP TS 36.521 and include: Maximum Output Power (MOP), Maximum Power Reduction (MPR), Additional Maximum Power Reduction (A-MPR), and Configured Transmitted Output Power.

As illustrated in Table 1, MOP levels and tolerances with which UEs can physically transmit data on a given operating band (e.g., Bands I-III) are specified according to UE Power Classes currently defined by section 6.2.2 of 3GPP TS 36.521.

TABLE 1

| Operating Band | Power Class 1 HPUE | | Power Class 2 HPUE | | Power Class 3 UE | | Power Class 4 UE | |
| --- | --- | --- | --- | --- | --- | --- | --- | --- |
| | Power (dBm) | Tol. (dB) | Power (dBm) | Tol. (dB) | Power (dBm) | Tol. (dB) | Power (dBm) | Tol. (dB) |
| Band I | 31 | ±2 | 26 | ±2 | 23 | ±2 | 21 | ±2 |
| Band II | — | — | 26 | ±2 | 23 | ±2 | 21 | ±2 |
| Band III | — | — | — | — | 23 | ±2 | 21 | ±2 |

For example, while off-the-shelf UEs (e.g., Power Class 3 UEs) transmit at a MOP of +23 dBm for Bands I-III (with a nominal power tolerance of ±2 dB for E-UTRA Bands), in Release 11 of the LTE standard, 3GPP specified High Power User Equipment (HPUEs) able to transmit at a higher MOP of +31 dBm (with a nominal power tolerance of ±2 dB for E-UTRA Bands) for low-Bands (e.g., E-UTRA Bands 1-14). 3GPP may apply MPR and/or A-MPR parameters to defined UE and HPUE MOPs to meet adjacent channel leakage ratio (ACLR) requirements and/or to enforce region-specific spurious emissions requirements. HPUEs MOP levels (and tolerances) are used to extend coverage in rural deployments and/or enhance coverage in rural/suburban areas.

Figure 1A:
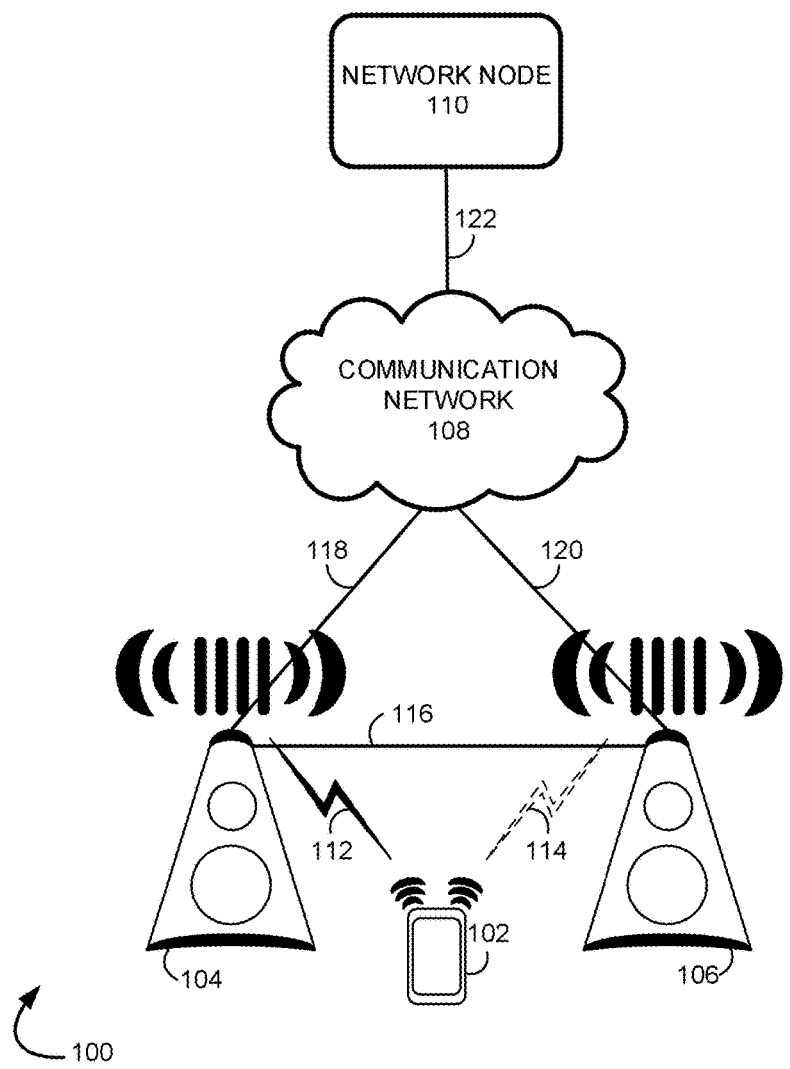
FIG. 1A illustrates an exemplary communication system for extending coverage of a wireless device operating in connected mode.
Figure 1B:
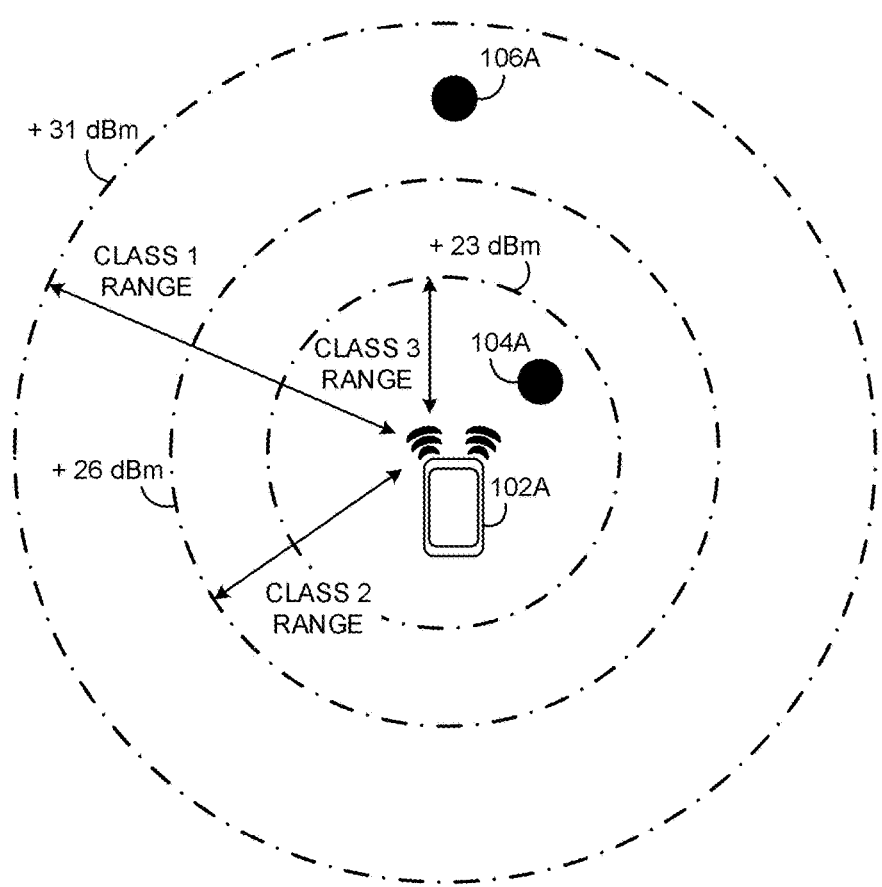
FIG. 1B illustrates a portion of the exemplary communication system for extending coverage of a wireless devices operating in connected mode illustrated in FIG. 1A.

Referring to FIGS. 1A and 1B, wireless device 102, 102A is configured as +26 dBm Power Class 2 HPUEs or +31 dBm Power Class 1 HPUEs and operates in a coverage area (not shown) of access node 104, 104A, 106, and/or 106A having a density designed for a LPUE (e.g., +23 dBm Power Class 3 UEs). In an exemplary embodiment, wireless device 102, 102A may be deployed for high-Bands (e.g., E-UTRA Bands 17-43). Network node 110 may set a handoff parameter (e.g., threshold), which neglects UE Power Class differences, for wireless device 102, 102A operating in a connected mode in the coverage area of access node 104, 104A, 106 and/or 106A. The set handoff parameter (e.g., threshold) for wireless device 102, 102A can be based on a MOP level (and tolerance) of a LPUE (e.g., +23 dBm Power Class 3 UE) operating in a same coverage area as the wireless device 102, 102A. Because of this, handoff of wireless device 102, 102A may be triggered to a neighboring access node 104, 104A, 106, 106A at a point earlier than necessary. For example, as illustrated in FIG. 1B, access node 104, 104A, 106, and/or 106A may trigger handoff of wireless device 102, 102A to a neighboring access node 104, 104A, 106, and/or 106A when, for example, a signal level reported by wireless devices 102, 102A meets a handoff parameter set based on a MOP level (and tolerance) of LPUEs (e.g., +23 dBm Power Class 3 UEs) operating in the same coverage area. Because of this, handoff of wireless device 102, 102A (operating in connected mode) may be triggered by network node 110 and/or access node 104, 104A, 106, and/or 106A when the wireless device 102A, 102A is located in, for example, a +23 dBm Power Class 3 UE coverage range rather than in a +26 dBm Power Class 2 HPUE and/or +31 dBm Power Class 3 HPUE coverage extension range.

Communication system 100 can comprise wireless devices 102, 102A, access nodes 104, 104A, 106, 106A (including scheduling modules and/or associated scheduling nodes), communication network 108, and network node 110. Other network elements may be present in the communication system 100 to facilitate communication but are omitted for clarity, such as base stations, base station controllers, gateways, Mobile Switching Centers (MSC), Dispatch Application Processors (DAPs), and location registers such as a Home Location Register (HLR) or Visitor Location Register (VLR). Furthermore, other network elements may be present to facilitate communication, such as between access nodes 104, 106 and communication network 108, which are omitted for clarity, including additional processing nodes, controller nodes, routers, gateways, and physical and/or wireless data links for carrying data among the various network elements.

Wireless device 102, 102A can be any device configured to communicate over communication system 100 using a wireless interface. For example, wireless device 102, 102A can include a remote terminal unit, a cell phone, a smart phone, a computing platform such as a laptop, palmtop, or a tablet, a Personal Digital Assistant (PDA), or an internet access device, and combinations thereof. Wireless device 102, 102A can be configured as HPUEs or Power Class 1 HPUEs (i.e., UEs capable of transmitting at a MOP level of at least +31 dBm), Power Class 2 HPUEs (i.e., UEs capable of transmitting at a MOP level of at least +26 dBm), and/or Power Class 3 UEs (i.e., UEs capable of transmitting at a MOP level of at least +23 dBm). It is noted that while FIGS. 1A and 1B illustrate one wireless device 102, 102A in communication with access node 104, 104A, 106 and/or 106A, any number of wireless devices can be implemented according to various exemplary embodiments disclosed herein.

The wireless interface of wireless device 102, 102A can include one or more transceivers for transmitting and receiving data over communication system 100. Each transceiver can be associated with the same or different frequency bands, the same or different radio access technologies, the same or different network providers, and/or the same or different services. For example, wireless device 102, 102A can include a transceiver that is associated with one or more of the following: Code Division Multiple Access (CDMA), Global System for Mobile Communications (GSM), Worldwide Interoperability for Microwave Access (WiMAX), Long Term Evolution (LTE), and/or High-Speed Downlink Packet Access (HSDPA), IEEE 802.11, Wireless Fidelity (WiFi), Bluetooth, Zigbee, Infrared Data Association (IrDA), Multimedia Broadcast Multicast Service (MBMS), etc.

Wireless device 102, 102A can be in communication with access node 104, 104A through communication link 112. Wireless device 102, 102A can be in communication with access nodes 106, 106A through, for example, communication link 114 as illustrated in FIG. 1A. Links 112, 114 can use various communication media, such as air, space, or some other signal propagation path—including combinations thereof. Links 112, 114 can comprise many different signals sharing the same link. Links 112, 114 could include multiple signals operating in a single "airpath" comprising beacon signals, user communications, communication sessions, overhead communications, frequencies, timeslots, transportation ports, logical transportation links, network sockets, packets, or communication directions. For example, user communication between wireless device 102, 102A and access node 104, 104A could share the same representative wireless link, but be transferred over different communication sessions, frequencies, timeslots, packets, ports, sockets, logical transport links, or in different locations—including combinations thereof.

Wireless device 102, 102A can transmit and/or receive information over system 100 using various communication services. These services can include various voice, data, and/or MBMS services and applications. For example, mobile voice services, mobile data services, Push-to-Talk (PTT) services, internet services, web browsing, email, pictures, picture messaging, video, video messaging, broadcast video, audio, voicemail, music, MP3's, ring tones, stock tickers, news alerts, etc.

Access nodes 104, 104A, 106, 106A can be any network node configured to provide communication between wireless device 102, 102A and communication network 108. Access nodes 104, 104A, 106, 106A can be standard access nodes and/or short range, low-power access nodes. Access nodes 104, 104A, 106, 106A can be within at least a portion of an overlapping coverage area of the other 104, 104A, 106, 106A, where each access node 104, 104A, 106, 106A has a coverage area that includes a cell-edge portion between the full strength coverage area and the edge of the cell coverage area.

A standard access node can be a macrocell access node such as a base transceiver station, a radio base station, an eNodeB device, or an enhanced eNodeB device, or the like. In an exemplary embodiment, a macrocell access node can have a coverage area in the range of approximately five kilometers to thirty-five kilometers and an output power in the tens of watts. A short range access node can include a microcell access node, a picocell access node, a femtocell access node, or the like such as a home NodeB or a home eNodeB device. In an exemplary embodiment, a picocell access node can have a coverage area of approximately a half a kilometer and an output power of less than one watt. In yet another exemplary embodiment, a femtocell access node can have a coverage area in the range of fifty to two-hundred meters and an output power in the range of 0.5 to 2 watts. Femtocell access nodes can be cellular access nodes or WiFi access nodes. In addition, a wireless device configured to enter a hotspot mode can be a femtocell access node. It is noted that while two access nodes 104, 104A, 106, 106A are illustrated in each of FIGS. 1A and 1B, any number of access nodes can be implemented within system 100.

Access nodes 104, 104A, 106, 106A can comprise a processor and associated circuitry to execute or direct the execution of computer-readable instructions to obtain information. Access nodes 104, 104A, 106, 106A can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Access nodes 104, 104A, 106, 106A can receive instructions and other input at a user interface.

Network node 110 can be any network node configured to communicate information and/or control information over system 100. For example, network node 110 can receive information from or transmit information to wireless device 102, 102A over system 100. For ease of illustration, network node 110 is shown to be located within the backhaul of the system 100. However, network node 110 could alternatively be between access nodes 104, 104A and/or 106, 106A and communication network 108. Network node 110 can be a standalone computing device, computing system, or network component, and can be accessible, for example, by a wired or wireless connection, or through an indirect connection such as through a computer network or communication network. For example, network node 110 can include a Mobility Management Entity (MME), a Home Subscriber Server (HSS), a Policy Control and Charging Rules Function (PCRF), an Authentication, Authorization, and Accounting (AAA) node, a Rights Management Server (RMS), a Subscriber Provisioning Server (SPS), a policy server, etc. One of ordinary skill in the art would recognize that network node 110 is not limited to any specific technology architecture, such as LTE and can be used with any network architecture and/or protocol.

Network node 110 can comprise a processor and associated circuitry to execute or direct the execution of computer-readable instructions to obtain information. Network node 110 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Network node 110 can receive instructions and other input at a user interface.

Access node 104, 104A can be in communication with access node 106, 106A through communication link 116 and with communication network 108 through communication link 118. Access node 106, 106A can be in communication with communication network 108 through communication link 120. Network node 110 can be in communication with communication network 108 through communication link 122. Communication links 116, 118, 120, 122 can be wired or wireless and use various communication protocols such as Internet, Internet Protocol (IP), Local-Area Network (LAN), optical networking, Hybrid Fiber Coax (HFC), telephony, Ti, or some other communication format—including combinations, improvements or variations thereof. Wireless communication links can be a radio frequency, microwave, infrared, or other similar signal, and can use a suitable communication protocol, for example, GSM, CDMA, WiMAX, or LTE, or combinations thereof. Other wireless protocols can also be used. Links 116, 118, 120, 122 can be a direct link or might include various equipment, intermediate components, systems, and networks.

Communication network 108 can be a wired and/or wireless communication network, and can comprise processing nodes, routers, gateways, and physical and/or wireless data links for carrying data among various network elements, including combinations thereof, and can include a LAN or Wide-Area Network (WAN), and an internetwork (including the internet). Communication network 108 can be capable of carrying data, for example, to support voice, PTT, broadcast video, and data communications by a wireless device such as wireless devices 102, 102A. Wireless network protocols can comprise MBMS, CDMA 1×RTT, GSM, Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and WiMAX. Wired network protocols that may be utilized by communication network 108 comprise Ethernet, Fast Ethernet, Gigabit Ethernet, Local Talk (such as Carrier Sense Multiple Access with collision Avoidance), Token Ring, Fiber Distributed Data Interface (FDDI), and Asynchronous Transfer Mode (ATM). Communication network 108 can also comprise additional base stations, controller nodes, telephony switches, internet routers, network gateways, computer systems, communication links, or some other type of communication equipment, and combinations thereof.

Figure 2:
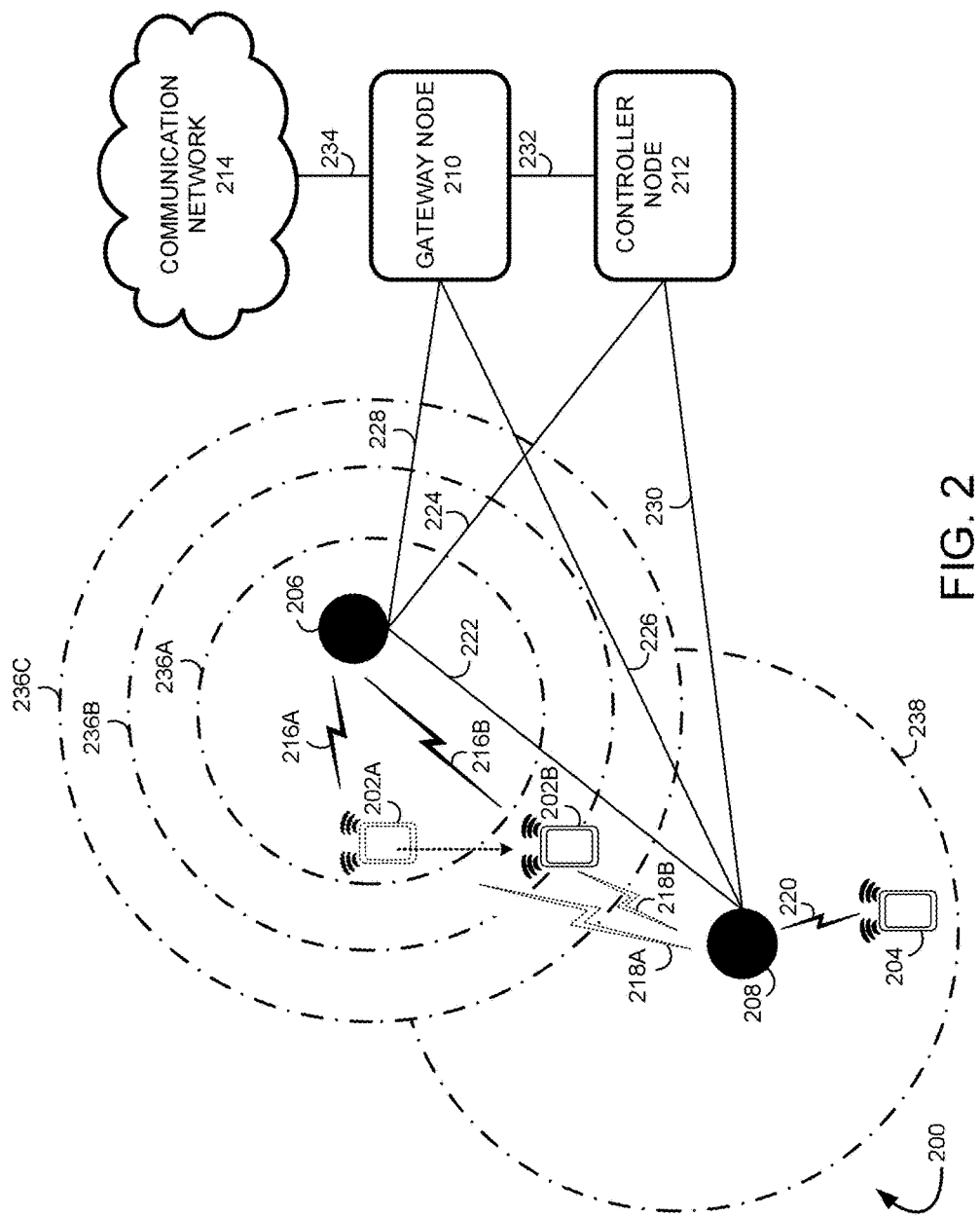
FIG. 2 illustrates another exemplary communication system for extending coverage of a wireless device operating in connected mode.

FIG. 2 illustrates an exemplary communication system 200 for extending coverage of a wireless device operating in connected mode. The system 200 will be discussed with reference to the exemplary communication system 100 illustrated in FIGS. 1A and 1B. Communication system 200 can comprise wireless devices 202A, 202B, 204, access nodes 206, 208, gateway node 210, controller node 212, and communication network 214. Other network elements may be present in the communication system 200 to facilitate communication but are omitted for clarity, such as base stations, base station controllers, gateways, MSC, DPAs, and location registers such as a HLR or VLR. Furthermore, other network elements may be present to facilitate communication, such as between access nodes 206, 208 and communication network 214, which are omitted for clarity, including additional processing nodes, routers, gateways, and physical and/or wireless data links for carrying data among the various network elements.

Wireless devices 202A, 202B, 204, can be any device configured to communicate over system 200 using a wireless interface. For example, wireless devices 202A, 202B, 204 can include a remote terminal unit, a cell phone, a smart phone, a computing platform such as a laptop, palmtop, or a tablet, a PDA, or an internet access device, and combinations thereof. Wireless devices 202A, 202B, 204 can be configured as HPUEs or Power Class 1 HPUEs (i.e., UEs capable of transmitting at a MOP level of at least +31 dBm), Power Class 2 HPUEs (i.e., UEs capable of transmitting at a MOP level of at least +26 dBm), and/or Power Class 3 HPUEs (i.e., UEs capable of transmitting at a MOP level of at least +23 dBm).

The wireless interface of wireless devices 202A, 202B, 204 can include one or more transceivers for transmitting and receiving data over communication system 200. Each transceiver can be associated with the same or different frequency bands, the same or different radio access technologies, the same or different network providers, and/or the same or different services. For example, wireless devices 202A, 202B, 204, can include a transceiver that is associated with one or more of the following: CDMA, GSM, WiMAX, LTE, HSDPA, IEEE 802.11, WiFi, Bluetooth, Zigbee, IrDA, MBMS, etc.

Wireless devices 202A, 202B, 204 can be in communication with access nodes 206 and/or 208 through communication links 216A, 216B, 218A, 218B, 220. Links 216A, 216B, 218A, 218B, 220 can use various communication media, such as air, space, metal, optical fiber, or some other signal propagation path—including combinations thereof. Links 216A, 216B, 218A, 218B, 220 may comprise many different signals sharing the same link. Links 216A, 216B, 218A, 218B, 220 could include multiple signals operating in a single "airpath" comprising beacon signals, user communications, communication sessions, overhead communications, frequencies, timeslots, transportation ports, logical transportation links, network sockets, packets, or communication directions. For example, user communication between wireless device 202A, 202B and access node 206 could share the same representative wireless link, but be transferred over different communication sessions, frequencies, timeslots, packets, ports, sockets, logical transport links, or in different directions—including combinations thereof.

Wireless devices 202A, 202B, 204 can transmit and/or receive information over system 200 using various communication services. These services can include various voice, data, and/or MBMS services and applications. For example, mobile voice services, mobile data services, PTT services, internet services, web browsing, email, pictures, picture messaging, video, video messaging, broadcast video, audio, voicemail, music, MP3's, ring tones, stock tickers, new alerts, etc.

Access nodes 206, 208 can be any network node configured to provide communication between wireless devices 202A, 202B, 204 and communication network 214. Access nodes 206, 208 can be standard access nodes or short range, low-power access nodes. At least a portion of a coverage area 236A, 236B, 236C, 238 of access nodes 206, 208 can be overlapping with the other 206, 208, where each access node 206, 208 has a coverage area 236A, 236B, 236C, 238 that includes a cell-edge portion between the full strength coverage area and the edge of the cell coverage area. The coverage area 236A, 236B, 236C, 238 of access nodes 206, 208 can be extended or configured to propagate inside buildings based on, for example, the operating frequency band and/or the Power Class/MOP level (and tolerances) of a particular wireless device 202A, 202B, 204 operating in connected mode with the access node 206, 208.

A standard access node can be a macrocell access node such as a base transceiver station, a radio base station, an eNodeB device, or an enhanced eNodeB device, or the like. In an exemplary embodiment, a macrocell access node can have a coverage area in the range of approximately five kilometers to thirty-five kilometers and an output power in the tens of watts. A short range access node can include a microcell access node, a picocell access node, a femtocell access node, or the like such as a home NodeB or a home eNodeB device. In an exemplary embodiment, a picocell access node can have a coverage area of approximately a half a kilometer and an output power of less than one watt. In yet another exemplary embodiment, a femtocell access node can have a coverage area in the range of fifty to two-hundred meters and an output power in the range of 0.5 to 1 watts. Femtocell access nodes can be cellular access nodes or WiFi access nodes. In addition, a wireless device configured to enter a hotspot mode can be a femtocell access node. It is noted that while two access nodes 206, 208 are illustrated in FIG. 2A, any number of access nodes can be implemented within system 200.

Access nodes 206, 208 can comprise a processor and associated circuitry to execute or direct the execution of computer-readable instructions to obtain information. Access nodes 206, 208 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Access nodes 206, 208 can receive instructions and other input at a user interface.

Gateway 210 can be any network node configured to interface with other network nodes using various protocols. Gateway 210 can communicate user data over system 300. Gateway 210 can be a standalone computing device, computing system, or network component, and can be accessible, for example, by a wired or wireless connection, or through an indirect connection such as through a computer network or communication network. For example, gateway 210 can include a Serving Gateway (SGW) and/or a Public Data Network Gateway (PGW), etc. One of ordinary skill in the art would recognize that gateway 210 is not limited to any specific technology architecture, such as LTE and can be used with any network architecture and/or protocol.

Gateway 210 can comprise a processor and associated circuitry to execute or direct the execution of computer-readable instructions to obtain information. Gateway 210 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Gateway 210 can receive instructions and other input at a user interface.

Controller node 212 can be any network node configured to communicate information and/or control information over system 200. Controller node 212 can be configured to transmit control information associated with a handover procedure. Controller node 212 can be a standalone computing device, computing system, or network component, and can be accessible, for example, by a wired or wireless connection, or through an indirect connection such as through a computer network or communication network. For example, controller node 212 can include a MME, a HSS, a PCRF, an AAA node, a RMS, a SPS, a policy server, etc. One of ordinary skill in the art would recognize that controller node 212 is not limited to any specific technology architecture, such as LTE and can be used with any network architecture and/or protocol.

Controller node 212 can comprise a processor and associated circuitry to execute or direct the execution of computer-readable instructions to obtain information. Controller node 212 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Controller node 212 can receive instructions and other input at a user interface.

Access node 206 can be in communication with access node 208 through communication link 222. Access node 206 can be in communication with gateway 210 through communication link 228 and with controller node 212 through communication link 224. Access node 208 can be in communication with gateway 210 through communication link 226 and with controller node 212 through communication link 230. Gateway 210 can be in communication with controller node 212 through communication link 232 and with communication network 214 through communication link 234. Links 222, 224, 226, 228, 230, 232, 234 can be wired or wireless and use various communication protocols such as Internet, IP, LAN, optical networking, HFC, telephony, Ti, or some other communication format—including combinations, improvements, or variations thereof. Links 222, 224, 226, 228, 230, 232, 234 can be a radio frequency, microwave, infrared, or other similar signal, and can use a suitable communication protocol, for example, GSM, CDMA, WiMAX, or LTE, or combinations thereof. Other wireless protocols can also be used. Links 222, 224, 226, 228, 230, 232, 234 can be a direct link or might include various equipment, intermediate components, systems, and networks.

Communication network 214 can be a wired and/or wireless communication network, and can comprise processing nodes, routers, gateways, and physical and/or wireless data links for carrying data among various network elements, including combinations thereof, and can include a LAN or WAN, and an internetwork (including the internet). Communication network 214 can be capable of carrying data, for example, to support voice, PTT, broadcast video, and data communications by a wireless device such as wireless device 202A, 202B. Wireless network protocols can comprise MBMS, CDMA 1xRTT, GSM, UMTS, HSPA, EV-DO, EV-DO rev. A, 3GPP LTE, and WiMAX. Wired network protocols that may be utilized by communication network 214 comprise Ethernet, Fast Ethernet, Gigabit Ethernet, Local Talk (such as Carrier Sense Multiple Access with Collision Avoidance), Token Ring, FDDI, ATM. Communication network 214 can also comprise additional base stations, controller nodes, telephony switches, internet routers, network gateways, computer systems, communication links, or some other type of communication equipment, and combinations thereof.

Referring to FIG. 2, in one embodiment, wireless device 202A, 202B may be configured as a higher Power Class UE (HPUE) and operate in a coverage area 236A of access node 206 having a density designed for LPUE 204 (i.e., a Power Class UE having a Maximum Output Power (MOP) level (and tolerance) that is lower than a MOP level (and tolerance) of an HPUE operating in a same coverage area 236A) and/or common Power Class UE 204. Communication network 214 via access node 206 may establish a link 216A between wireless device 202A, 202B and access node 206 such that data packets are transferred to/from wireless device 202A, 202B in both uplink (UL) and downlink (DL) directions. As wireless device 202A, 202B moves throughout network 214, access node 206 may configure wireless device 202A, 202B measurement report procedures based on handoff parameters (e.g., threshold) set for LPUE 204 and/or common Power Class UE 204.

For example, access node 206 may send a mobility handoff message (e.g., a MEASUREMENT CONTROL REQ. message) to wireless device 202A, 202B, which sets mobility handoff parameter(s) (e.g., signal level threshold) for wireless device 202A, 202B based on, for example, a MOP level (and tolerance) of a LPUE 204 and/or common Power Class UE 204 operating in a same coverage area as wireless device 202A, 202B. The mobility handoff parameter(s) can set a signal strength threshold (of access node 206 and/or access node 208) used for handoff of wireless device 202A, 202B. Signal strength indicators (measured by wireless device 202A, 202B, 204 and reported to access node 206 and/or 208) can include, for example, a Reference Signal Received Power (RSRP), a Received Signal Strength Indication (RSSI), a Signal-to-Noise Ratio (SNR), a Carrier-to-Noise Ratio (CNR) value, a Signal Noise and Distortion (SINAD), a Signal to Interference (SII), a Signal to Noise Plus Interference (SINR), a Signal to Quantization Noise Ratio (SQNR), etc., associated with access node 206 and/or access node 208. The signal strength can further comprise an indication of signal quality, such as a Reference Signal Receive Quality (RSRQ), a Channel Quality Indicator (CQI), and/or Quality of Service (QoS) requirements, call type, or other policy-related aspects.

Because the mobility handoff parameter(s) (e.g., signal level threshold) for wireless device 202A, 202B is set based on the MOP level (and tolerance) of LPUE 204 and/or common Power Class UE 204 operating in a same coverage area as wireless device 202A, 202B, handoff of wireless device 202A, 202B is triggered to neighboring access node 208 at the location of wireless device 202A, as illustrated in FIG. 2. For example, in one embodiment, handoff of wireless device 202A, 202B is triggered to neighboring access node 208 when wireless device 202A, 202B is located in an LPUE 204 and/or common Power Class UE 204 a coverage range rather than in an HPUE coverage extension range. Because network 214 neglects UE Power Class differences, handoff of both LPUE/common Power Class UE 204 and wireless device 202A, 202B is performed to neighboring access node 208 when, for example, a downlink (DL) RSRP value (i.e., signal strength indicator) does not meet signal strength threshold set by network 214 for the mobility handoff parameters set based on LPUE 204 and/or common Power Class UE 204. Thus, capabilities of HPUEs operating in a coverage area 236A designed for LPUEs 204 and/or common Power Class UEs 204 are not fully exploited and coverage/extension gains of HPUEs are unnecessarily limited.

In one exemplary embodiment, mobility handoff parameters (e.g., signal level threshold) are set based on LPUE 204 and/or common Power Class UE 204 operating in coverage area 236A of access node 206. HPUE 202A, 202B operating in a same coverage area 236A as LPUE 204 and/or common Power Class UE 204 transmits a power report to access node 206, 208 that includes a MOP level and power headroom between a current UE Tx power (estimated power) of HPUE 202A, 202B and the nominal power of HPUE 202A, 202B. Based on the power report, access node 206, 208 calculates a pathloss change for HPUE 202A, 202B and adjusts a handoff trigger point for HPUE 202A, 202B. For example, the handoff trigger point for HPUE 202A, 202B may be adjusted based on the power headroom reported to access node 206, 208 in the power report, the calculated pathloss change for HPUE 202A, 202B, and the mobility handoff parameters set based on LPUE 204 and/or common Power Class UE 204.

In another exemplary embodiment, mobility handoff parameters (e.g., signal level threshold) are set based on LPUE 204 and/or common Power Class UE 204 operating in coverage area 236A of access node 206. An HPUE 202A, 202B operating in a same coverage area 236A as LPUE 204 and/or common Power Class UE 204 may be instructed by network 214 to report a Power Class at access node 206, 208. Access node 206, 208 may use the reported Power Class of HPUE 202A, 202B to calculate a power class delta for HPUE 202A, 202B. For example, a power class delta for HPUE 202A, 202B may be calculated based on a difference of the reported Power Class of HPUE 202A, 202B and a Power Class of LPUE 204 and/or common Power Class UE 204 operating in a same coverage area 236A. The network 214 via access node 206, 208 may apply the calculated power class delta for HPUE 202A, 202B to the mobility handoff parameter(s) set based on LPUE 204 and/or common Power Class UE 204 (i.e., adjusted mobility handoff parameter).

In one exemplary embodiment, mobility handoff parameters (e.g., signal level threshold) are set based on a common Power Class UE 204 operating in coverage area 236A of access node 206. Access node 206, 208 may receive an ATTACH request, for example, that includes a MOP level and power headroom between a current UE Tx power (estimated power) of HPUE 202A, 202B and the nominal power of HPUE 202A, 202B, from HPUE 202A, 202B. Network 214 may determine at access node 206, 208 that the reported MOP level (and/or Power Class) is different from the MOP level and/or Power Class of the common Power Class UE 204. For example, HPUE 202A, 202B may have a higher or lower MOP level (or Power Class) than common Power Class UE 204. Based on the MOP level (and/or Power Class) reported by HPUE 202A, 202B during the ATTACH request, access node 206, 208 may adjust a handover trigger threshold for HPUE 202A, 202B. Access node 206, 208 may instruct HPUE 202A, 202B to extend its coverage 236B, 236C until the adjusted handover trigger threshold is met.

FIG. 3 illustrates a flow chart of an exemplary method for extending coverage of a wireless device operating in connected mode. The method will be discussed with reference to the exemplary communication system 200 illustrated in FIG. 2. However, the method for extending coverage of a wireless device operating in connected mode illustrated in FIG. 3 can be implemented in the exemplary communication system 100 illustrated in FIGS. 1A and 1B, or with any suitable communication system. In addition, although FIG. 3 depicts steps performed in a particular order for purposes of illustration and discussion, the methods discussed herein are not limited to any particular order or arrangement. One skilled in the art, using the disclosure provided herein, will appreciate that various steps of the method can be omitted, rearranged, combined, and/or adapted in various ways.

Figure 3A:
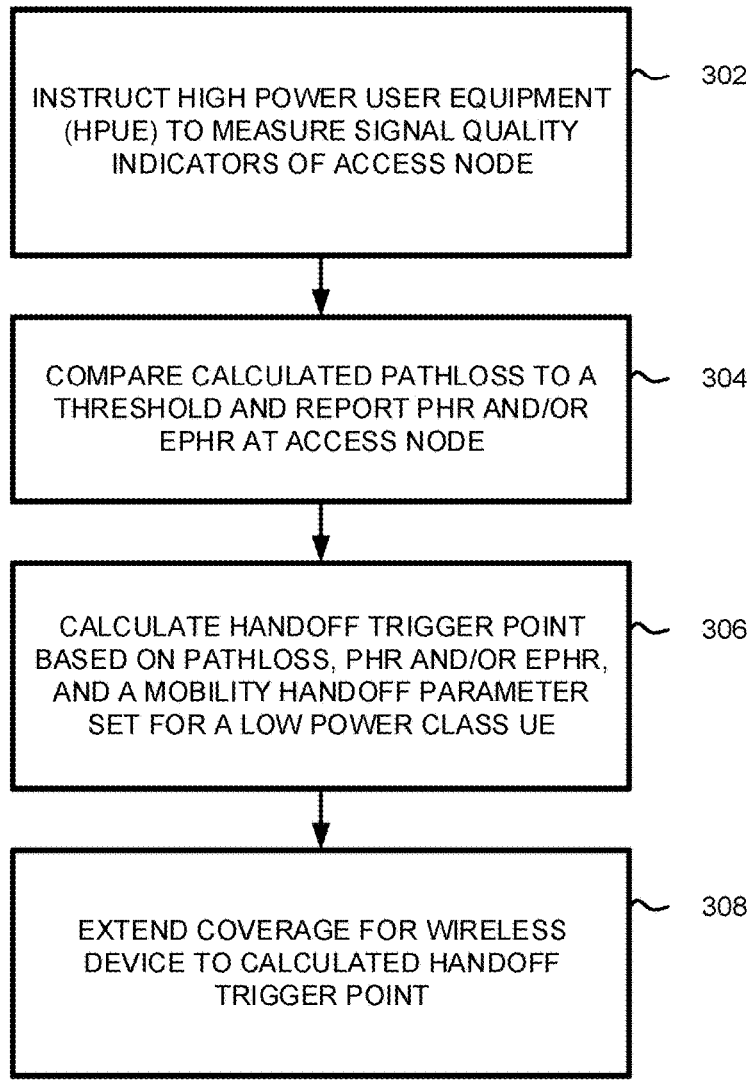
FIG. 3A illustrates a flow chart of an exemplary method for extending coverage of a wireless device operating in connected mode.
Figures 3B, 3C:
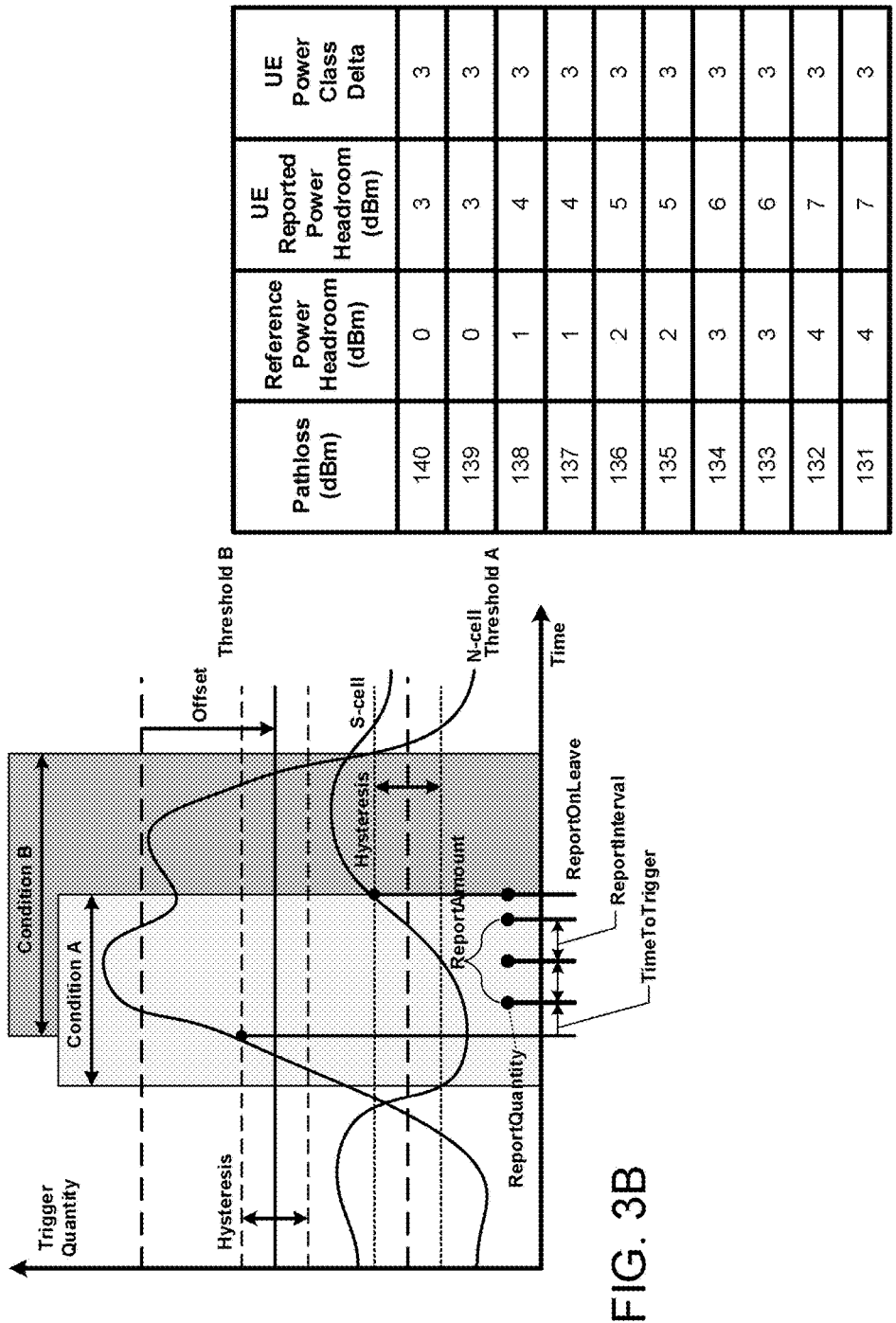
FIGS. 3B and 3C illustrate graphs and charts for PHR and ePHR reporting and pathloss calculation.

Referring to FIGS. 3A-3C, wireless device 202A, 202B (illustrated in FIG. 2) is configured as a +26 dBm Power Class 2 HPUE or +31 dBm Power Class 1 HPUE and operates in a Radio Resource Control (RRC) Connected state within coverage area 236A, 236B, 236C, 238 of access node 206 and/or access node 208. Access nodes 206, 208 may have a density designed for LPUEs 204 (e.g., +23 dBm Power Class 3 UEs). Wireless device 202A, 202B may initially establish a communication link 216A via an ATTACH procedure with access node 206 (e.g., upon initialization or during a handover procedure) such that data packets are communicated to/from network 214 via access node 206 in both UL and DL directions.

At 302, network 214 instructs wireless device 202A, 202B to measure signal strength/quality indicators (e.g., RSRP, RSRQ, etc.) against set mobility handoff parameters (e.g., signal level threshold) of neighboring access nodes 206, 208 (e.g., via a MEASUREMENT REPORT) when at least one or more of the following events (illustrated in FIG. 3B) is triggered: (i) the RSRP value of access node 206 is greater than an absolute threshold; (ii) the RSRP value of access node 206 is less than an absolute threshold; (iii) the RSRP value of neighboring access node 208 is greater than an offset relative to access node 206; (iv) the RSRP value of neighboring access node 208 is greater than an absolute threshold; (v) the RSRP value of access node 206 is less than an absolute threshold and the RSRP value of neighboring access node 208 is greater than another absolute threshold; (vi) the RSRP value of neighboring access node 208 operating on a different Radio Access Technology (RAT) is greater than an absolute threshold; and (vii) the RSRP value of access node 206 is less than an absolute threshold and the RSRP value of the neighboring access node 208 operating on a different RAT is greater than another threshold. Network 214 may specify a time-to-trigger parameter (e.g., an amount of time during which the event (i)-(vii) must be satisfied).

At 304, access node 206 uses a period timer and/or pathloss (illustrated in FIG. 3C) to trigger a Power Headroom (PHR) and/or Extended Power Headroom (ePHR) report by wireless device 202A, 202B. PHR and ePHR are defined in sections 5.4.6, 6.1.3.6, and 6.1.3.6a of 3GPP TS 36.321 Technical Specification Group Long Term Evolution; Evolved Universal Terrestrial Radio Access (E-UTRA); Medium Access Control (MAC) protocol specification (i.e., Release 12, version 12.5.0), the contents of which are incorporated by reference herein. For example, PHR and/or ePHR reporting by wireless device 202A, 202B is triggered by: configuring two timers PeriodicPHR-Timer and ProhibitPHR-Timer (e.g., periodic transmit of PHR and/or ePHR reports by wireless device 202A, 202B as set by network 214); and/or (ii) signaling dl-PathlossChange (e.g., which sets a change measured in DL pathloss and a required power backoff due to power management as allowed by P-MPR to trigger PHR). Pathloss change may be calculated by wireless device 202A, 202B from a delta between, for example, an signal strength/quality indicators value (i.e., Reference Power Headroom illustrated in FIG. 3C) for access node 206 and/or neighboring access node 208 (e.g., notified by network 214 and measured at an antenna port of wireless device 202A, 202B) and the (current) UL Tx power state (i.e., UE Reported Power Headroom illustrated in FIG. 3C) of wireless device 202A, 202B. When pathloss change meets or exceeds a signaling dl-PathlossChange threshold, network 214 may trigger wireless device 202A, 202B to send a PHR and/or ePHR to access node 206. PHR and/or ePHR reported by wireless device 202A, 202B at access node 206 is used by access node 206 to determine a difference between the (nominal) MOP level (and tolerance) of wireless device 202A, 202B and a (current) UL Tx power state of wireless device 202A, 202B. The MOP level (and tolerance) for wireless device 202A, 202B depends on the UE Power Class (illustrated in Table 1), which includes: MPR, A-MPR, and Configured Transmitted Output Power.

At 306, network node 214 via access node 206 can use the PHR and/or ePHR report sent from wireless device 202A, 202B, the calculated pathloss change, and the set mobility handoff parameters (e.g., signal level threshold) set for a LPUE (e.g., +23 dBm Power Class 3 UE) to determine a handoff trigger point for wireless device 202A, 202B.

At 308, handoff of wireless device 202A, 202B is triggered to neighboring access node 208 when wireless device 202A, 202B is located in the +26 dBm Power Class 2 HPUE (e.g., coverage area 236B) and/or +31 dBm Power Class 1 HPUE extended coverage range (e.g., coverage area 236C) rather than the +23 dBm Power Class 3 coverage range (e.g., coverage area 236A). In other words, when the handoff trigger point determined at 306 has not been met, the network extends coverage for wireless device 202A, 202B.

One skilled in the art, using the disclosure provided herein, will appreciate that various steps of the methods can be omitted, rearranged, combined and/or adapted in various ways and can be completed by multiple wireless devices and access nodes, for example between wireless devices 202A, 202B, and 204.

Figure 4:
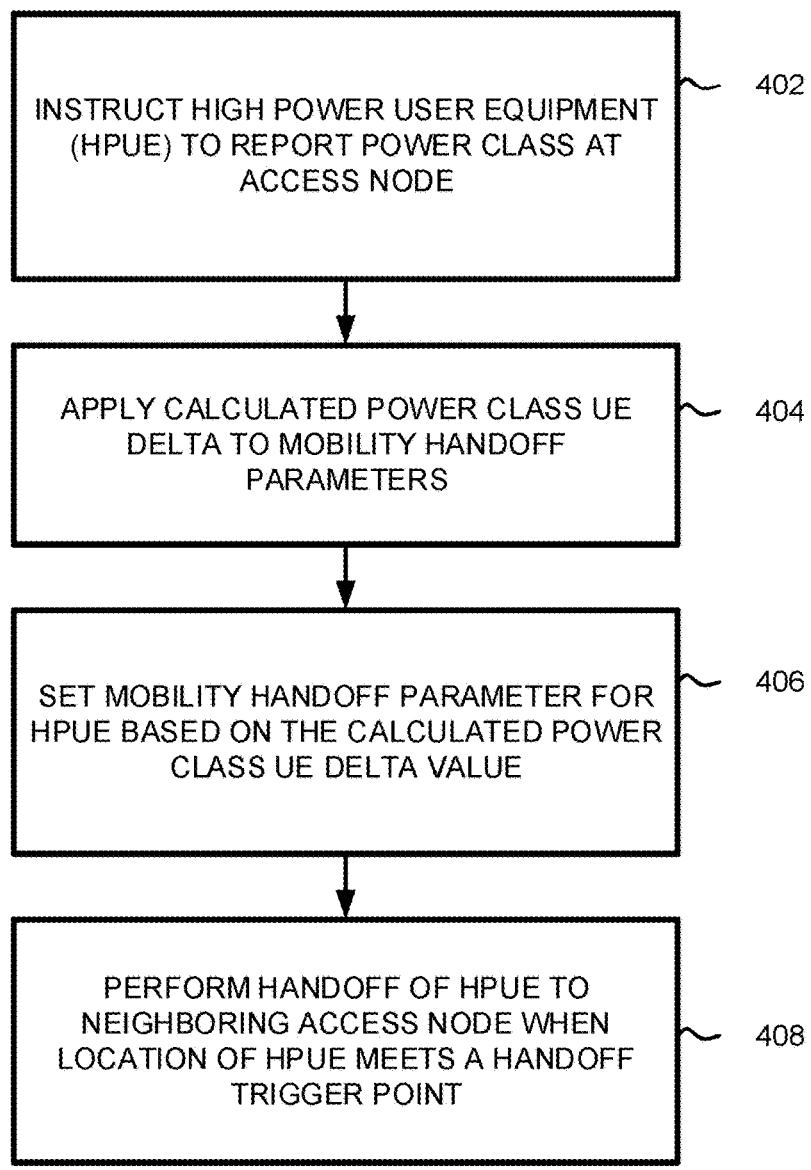
FIG. 4 illustrates another flow chart of an exemplary method for extending coverage of a wireless device operating in connected mode.

FIG. 4 illustrates another flow chart of an exemplary method for extending coverage of a wireless device operating in connected mode. The method will be discussed with reference to the exemplary communication system 200 illustrated in FIG. 2. However, the method for extending coverage of a wireless device operating in connected mode illustrated in FIG. 4 can be implemented in the exemplary communication system 100 illustrated in FIGS. 1A and 1B, or with any suitable communication system. In addition, although FIG. 4 depicts steps performed in a particular order for purposes of illustration and discussion, the methods discussed herein are not limited to any particular order or arrangement. One skilled in the art, using the disclosure provided herein, will appreciate that various steps of the method can be omitted, rearranged, combined, and/or adapted in various ways.

Referring to FIG. 4, wireless device 202A, 202B (illustrated in FIG. 2) is configured as a +26 dBm Power Class 2 HPUE or +31 dBm Power Class 1 HPUE and operates in a Radio Resource Control (RRC) Connected state within coverage area 236A, 236B, 236C, 238 of access node 206 and/or access node 208. Access nodes 206, 208 may have a density designed for LPUEs 204 (e.g., +23 dBm Power Class 3 UEs). Wireless device 202A, 202B may initially establish a communication link 216A via an ATTACH procedure with access node 206 (e.g., upon initialization or during a handover procedure) such that data packets are communicated to/from network 214 via access node 206 in both UL and DL directions.

At 402, network 214 may instruct wireless device 202A, 202B to report its UE Power Class (illustrated in Table 1) to access node 206 via UE Capability Reporting during an ATTACH procedure or via event-triggered PHR and/or ePHR reporting. For example, in one embodiment, wireless device 202A, 202B sends an ATTACH REQUEST message together with a PDN CONNECTIVITY REQUEST to network 214 for connectivity on an established RRC Connection. Access node 206 may allocate links 216A, 216B, 224 (e.g., wireless resources) via controller node 212 for wireless device 202A, 202B. Controller node 212 updates network 214 with a location of wireless device 202A, 202B using an UPDATE LOCATION REQUEST message and requests a subscriber profile of wireless device 202A, 202B from network 214. After a link 216A, 216B is established between access node 206 and wireless device 202A, 202B, access node 206 may reconfigure resources to wireless device 202A, 202B by sending an RRC Connection Reconfiguration message to wireless device 202A, 202B. Wireless device 202A, 202B may update its RRC Connection configuration and respond to access node 206 with an RRC Connection Reconfiguration Complete message. The network 214 via access node 206 may then complete the initial ATTACH procedure with wireless device 202A, 202B. Wireless device 202A, 202B may use UE Capability Reporting at various stages during the ATTACH procedure to report its UE Power Class to access node 206 via network 214 (e.g., via the PDN CONNECTIVITY REQUEST, via a response to the UPDATE LOCATION REQUEST message, as part of the UE subscriber profile, etc.).

In an alternative embodiment, at 402, wireless device 202A, 202B may report its UE Power Class to access node 206 via event-triggered PHR and/or ePHR reporting. For example, network 214 may instruct wireless device 202A, 202B to measure signal strength/quality indicators (e.g., RSRP, RSRQ, etc.) against set mobility handoff parameters (e.g., signal level threshold) of neighboring access nodes 206, 208 (e.g., via a MEASUREMENT REPORT) when at least one or more of the following events (illustrated in FIG. 3B) is triggered: (i) the RSRP value of access node 206 is greater than an absolute threshold; (ii) the RSRP value of access node 206 is less than an absolute threshold; (iii) the RSRP value of neighboring access node 208 is greater than an offset relative to access node 206; (iv) the RSRP value of neighboring access node 208 is greater than an absolute threshold; (v) the RSRP value of access node 206 is less than an absolute threshold and the RSRP value of neighboring access node 208 is greater than another absolute threshold; (vi) the RSRP value of neighboring access node 208 operating on a different Radio Access Technology (RAT) is greater than an absolute threshold; and (vii) the RSRP value of access node 206 is less than an absolute threshold and the RSRP value of the neighboring access node 208 operating on a different RAT is greater than another threshold. Network 214 may specify a time-to-trigger parameter (e.g., an amount of time during which the event (i)-(vii) must be satisfied).

Access node 206 uses a period timer and/or pathloss (e.g., calculated using reported RSRP, RSRQ, etc.) to trigger a Power Headroom (PHR) and/or Extending Power Headroom (ePHR) report by wireless device 202A, 202B, which may include UE Power Class of wireless device 202A, 202B. PHR is defined in sections 5.4.6, 6.1.3.6, and 6.1.3.6a of 3GPP TS 36.321 Technical Specification Group Long Term Evolution; Evolved Universal Terrestrial Radio Access (E-UTRA); Medium Access Control (MAC) protocol specification (i.e., Release 12, version 12.5.0), the contents of which are incorporated by reference herein. For example, PHR and/or ePHR reporting by wireless device 202A, 202B is triggered by: configuring two timers PeriodicPHR-Timer and ProhibitPHR-Timer (e.g., periodic transmit of PHR and/or ePHR reports by wireless device 202A, 202B as set by network 214); and/or (ii) signaling dl-PathlossChange (e.g., which sets a change measured in DL pathloss and a required power backoff due to power management as allowed by P-MPR to trigger PHR). Pathloss change may be calculated by wireless device 202A, 202B from a delta between, for example, an signal strength/quality indicators value (i.e., Reference Power Headroom illustrated in FIG. 3C) for access node 206 and/or neighboring access node 208 (e.g., notified by network 214 and measured at an antenna port of wireless device 202A, 202B) and the (current) UL Tx power state (i.e., UE Reported Power Headroom illustrated in FIG. 3C) of wireless device 202A, 202B. When pathloss change meets or exceeds a signaling dl-PathlossChange threshold, network 214 may trigger wireless device 202A, 202B to send a PHR and/or ePHR to access node 206. PHR and/or ePHR reported by wireless device 202A, 202B at access node 206 is used by access node 206 to determine a difference between the (nominal) MOP level (and tolerance) of wireless device 202A, 202B and a (current) UL Tx power state of wireless device 202A, 202B. The MOP level (and tolerance) for wireless device 202A, 202B depends on the UE Power Class (illustrated in Table 1), which includes: MPR, A-MPR, and Configured Transmitted Output Power.

At 404 and 406, on receipt of the MEASUREMENT REPORT or PHR and/or ePHR report from wireless device 202A, 202B at access node 206, access node 206 may use the MEASUREMENT REPORT or PHR and/or ePHR report to calculate a Power Class UE δ (e.g., a difference in UE Power Class) between wireless device 202A, 202B and a UE Power Class (e.g., +23 dBm Power Class 3) used to set the mobility handoff parameters (e.g., signal level threshold). Access node 206 may apply the calculated Power Class UE δ (e.g., a difference in UE Power Class) to the mobility handoff parameters (e.g., signal level threshold) so that the handoff trigger point 236A, 236B, 236C for wireless device 202A, 202B is set x dBm lower per Power Class UE δ value.

At 408, handoff of wireless device 202A, 202B is triggered to neighboring access node 208 when a location of wireless device 202A, 202B in coverage area 236A, 236B, 236C, 238 of access node 206 and/or access node 208 meets the handoff trigger point (i.e., set x dBm lower per Power Class UE δ value). For example, the handoff trigger point for wireless device 202A, 202B may be extended from the +23 dBm Power Class 3 range (e.g., coverage area 236A) to the +26 dBm Power Class 2 HPUE (e.g., coverage area 236B) and/or +31 dBm Power Class 1 HPUE extended coverage range (e.g., coverage area 236C), as illustrated in FIG. 2.

One skilled in the art, using the disclosure provided herein, will appreciate that various steps of the methods can be omitted, rearranged, combined and/or adapted in various ways and can be completed by multiple wireless devices and access nodes, for example between wireless devices 202A, 202B, and 204.

Figure 5:
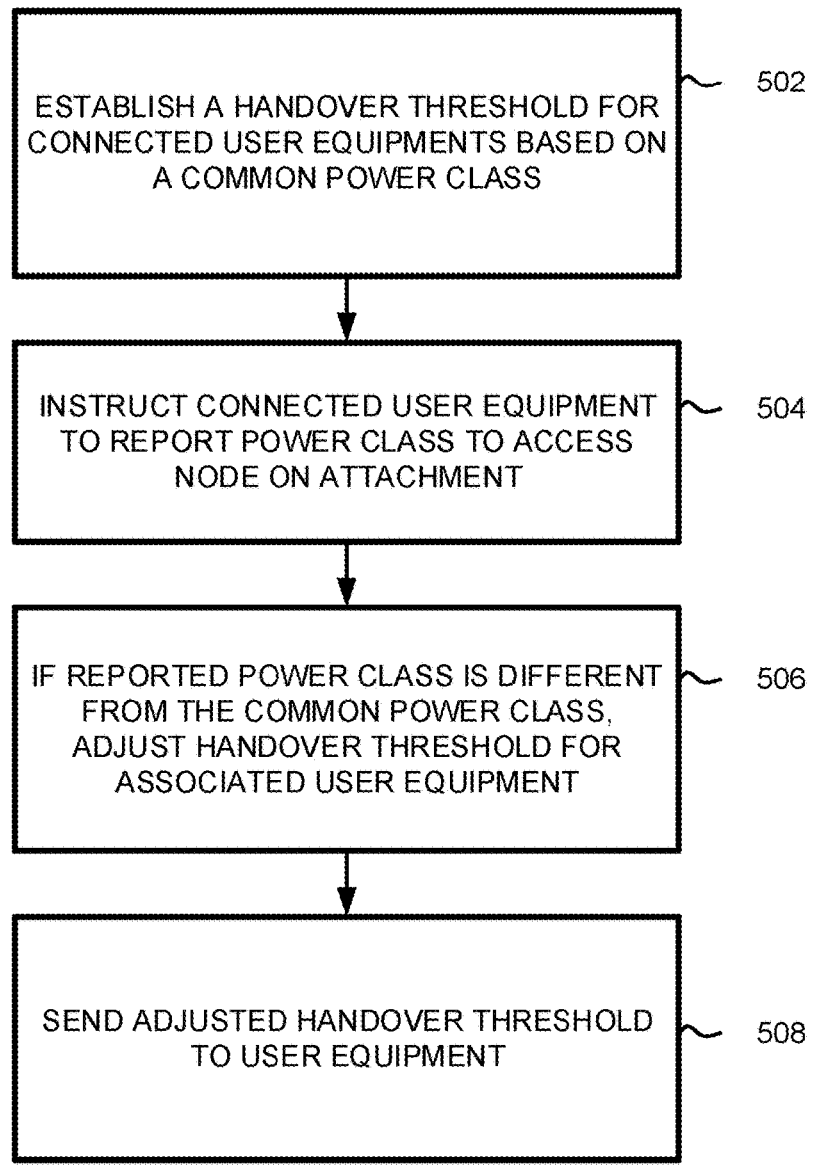
FIG. 5 illustrates another flow chart of an exemplary method for extending coverage of a wireless device operating in connected mode.

FIG. 5 illustrates another flow chart of an exemplary method for extending coverage of a wireless device operating in connected mode. The method will be discussed with reference to the exemplary communication system 200 illustrated in FIG. 2. However, the method for extending coverage of a wireless device operating in connected mode illustrated in FIG. 5 can be implemented in the exemplary communication system 100 illustrated in FIGS. 1A and 1B, or with any suitable communication system. In addition, although FIG. 5 depicts steps performed in a particular order for purposes of illustration and discussion, the methods discussed herein are not limited to any particular order or arrangement. One skilled in the art, using the disclosure provided herein, will appreciate that various steps of the method can be omitted, rearranged, combined, and/or adapted in various ways.

Referring to FIG. 5, wireless device 202A, 202B (illustrated in FIG. 2) is configured as a +26 dBm Power Class 2 HPUE or +31 dBm Power Class 1 HPUE and operates in a Radio Resource Control (RRC) Connected state within coverage area 236A, 236B, 236C, 238 of access node 206 and/or access node 208. Access nodes 206, 208 may have a density designed for common LPUEs 204 (e.g., +23 dBm Power Class 3 UEs). Wireless device 202A, 202B may initially establish a communication link 216A via an ATTACH procedure with access node 206 (e.g., upon initialization or during a handover procedure) such that data packets are communicated to/from network 214 via access node 206 in both UL and DL directions.

At 502, network 214 may set mobility handoff parameters (e.g., signal level threshold) of neighboring access nodes 206, 208 based on a most common UE Power Class operating within a coverage area 236A, 238 of access node 206 and/or access node 208, for example, common Power Class UE 204 (i.e., +23 dBm Power Class 3 UE). The mobility handoff parameters can set a signal strength threshold (of access node 206 and/or access node 208) for signal strength indicators used for handoff of wireless device 202A, 202B (i.e., uncommon UE Power Class UEs). Signal strength indicators (measured by, for example, by a most common Power Class UEs 204 operating in a coverage area 236A, 238 of access node 206 and/or access node 208) used for handoff of wireless device 202A, 202B can include, for example, a Reference Signal Received Power (RSRP), a Received Signal Strength Indication (RSSI), a Signal-to-Noise Ratio (SNR), a Carrier-to-Noise Ratio (CNR) value, a Signal Noise and Distortion (SINAD), a Signal to Interference (SII), a Signal to Noise Plus Interference (SINR), a Signal to Quantization Noise Ratio (SQNR), etc., associated with access node 206 and/or access node 208. The signal strength indicators can further comprise an indication of signal quality, such as a Reference Signal Receive Quality (RSRQ), a Channel Quality Indicator (CQI), and/or Quality of Service (QoS) requirement, call type, or other policy-related aspects.

At 504, network 214 may instruct wireless device 202A, 202B to report its UE Power Class (illustrated in Table 1) to access node 206 via UE Capability Reporting during an ATTACH procedure. For example, in one embodiment, wireless device 202A, 202B sends an ATTACH REQUEST message together with a PDN CONNECTIVITY REQUEST to network 214 for connectivity on an established RRC Connection. Access node 206 may allocate links 216A, 216B, 224 (e.g., wireless resources) via controller node 212 for wireless device 202A, 202B. Controller node 212 updates network 214 with a location of wireless device 202A, 202B using an UPDATE LOCATION REQUEST message and requests a subscriber profile of wireless device 202A, 202B from network 214. After a link 216A, 216B is established between access node 206 and wireless device 202A, 202B, access node 206 may reconfigure resources to wireless device 202A, 202B by sending an RRC Connection Reconfiguration message to wireless device 202A, 202B. Wireless device 202A, 202B may update its RRC Connection configuration and respond to access node 206 with an RRC Connection Reconfiguration Complete message. The network 214 via access node 206 may then complete the initial ATTACH procedure with wireless device 202A, 202B. Wireless device 202A, 202B may use UE Capability Reporting at various stages during the ATTACH procedure to report its UE Power Class to access node 206 via network 214 (e.g., via the PDN CONNECTIVITY REQUEST, via a response to the UPDATE LOCATION REQUEST message, as part of the UE subscriber profile, etc.).

Figure 6:
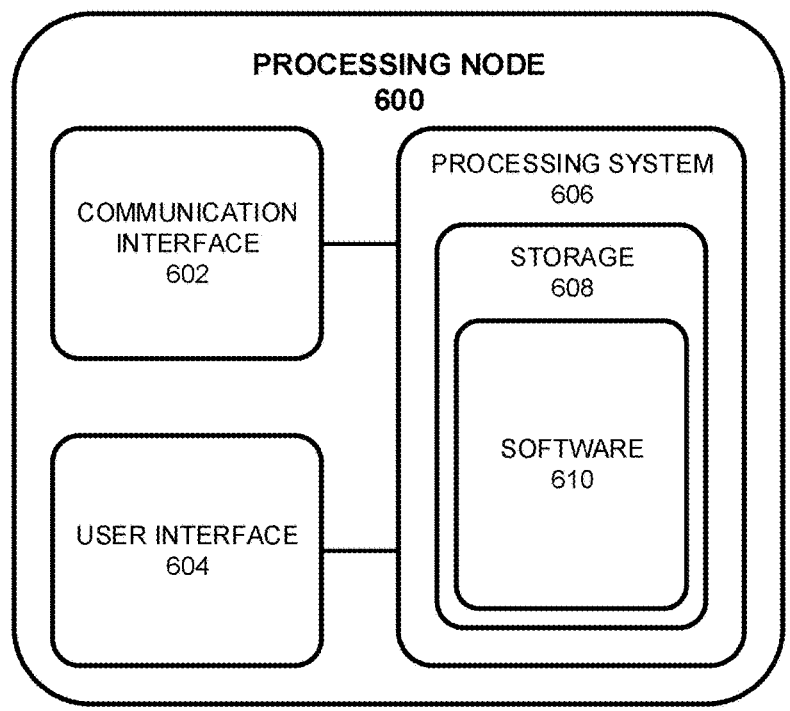
FIG. 6 illustrates an exemplary processing node.

At 506, if the UE Power Class of wireless device 202A, 202B reported at access node 206 during the ATTACH procedure is different from a most common UE Power Class (e.g., +23 dBm Power Class 3 UE) operating within a coverage area 236A, 238 of access node 206 and/or neighboring access node 208, access node 206 may store at a data storage device, illustrated in FIG. 6, the UE Power Class of wireless device 202A, 202B for wireless device 202A, 202B and adjust the mobility handoff parameters (e.g., signal level threshold) for wireless device 202A, 202B based on the stored UE Power Class. For example, access node 206 may apply a Power Class UE δ (e.g., a difference in UE Power Class) between the reported UE Power Class of wireless device 202A, 202B and a most common UE Power Class (e.g., +23 dBm Power Class 3 UE) of wireless devices 204 operating within a coverage area 236A, 238 of access node 206 and/or neighboring access node 208 (e.g., UE Power Class used by access node 206 to set the mobility handoff parameters). Access node 206 may set (or adjust) the handoff trigger point 236A, 236B, 236C for wireless device 202A, 202B x dBm lower per Power Class UE δ value for wireless device 202A, 202B based on the calculated Power Class UE δ value (i.e., revised handoff values). The Power Class UE δ value for wireless device 202A, 202B may be stored at a data storage device and the mobility handoff parameters (e.g., signal level threshold) for wireless device 202A, 202B may be adjusted for wireless device 202A, 202B accordingly.

At 508, network node 214 via access node 206 sends the adjusted mobility handoff parameters (e.g., signal level threshold) to wireless device 202A, 202B and instructs wireless device 202A, 202B to send measurement reports (e.g., reporting handoff candidate signal values) for neighboring access nodes 208 to access node 206 at the revised handoff trigger point 236A, 236B, 236C for wireless device 202A, 202B. For example, the network 214 via access node 206 may instruct wireless device 202A, 202B to extend coverage (i.e., handoff trigger point) from the +23 dBm Power Class 3 range (e.g., coverage area 236A) to the +26 dBm Power Class 2 HPUE (e.g., coverage area 236B) and/or +31 dBm Power Class 1 HPUE extended coverage range (e.g., coverage area 236C), as illustrated in FIG. 2. In this manner, access node 206 does not receive reports from wireless device 206 that are not needed for, for example, a +26 dBm Power Class 2 HPUE and/or other HPUE. That is, with the adjusted handoff values, the wireless device 202A, 202B will not start sending reports to access node 206 as early as it would if the handoff values were not adjusted at wireless device 202A, 202B based on a UE Power Class difference between wireless device 202A, 202B and a most common UE Power Class (e.g., +23 dBm Power Class 3 UE) of wireless devices 204 operating within a coverage area 236A, 238 of access node 206 and/or neighboring access node 208. This reduces the messaging between wireless device 202A, 202B and access node 206 and/or neighboring access node 208 and saves battery life of the wireless device 202A, 202B, particularly on high frequency bands such as Band 41. Or, for a LPUE, this same procedure would allow the LPUE to start sending measurement reports (e.g., reporting handoff candidate signal values) earlier than a most common UE Power Class (e.g., +23 dBm Power Class 3 UEs) of wireless devices 204 operating within a coverage area 236A, 238 of access node 206 and/or neighboring access node 208. This avoids dropped connections if the LPUE used a same mobility handoff parameters (e.g., signal level threshold) as the most common UE Power Class (e.g., +23 dBm Power Class 3 UEs), particularly on high frequency bands such as Band 41.

One skilled in the art, using the disclosure provided herein, will appreciate that various steps of the methods can be omitted, rearranged, combined and/or adapted in various ways and can be completed by multiple wireless devices and access nodes, for example between wireless devices 202A, 202B, and 204.

FIG. 6 illustrates an exemplary processing node 600 in a communication system. Processing node 600 comprises communication interface 602, user interface 604, and processing system 606 in communication with communication interface 602 and user interface 604. Processing node 600 can be configured to determine a communication access node for a wireless device. Processing system 606 includes storage 608, which can comprise a disk drive, flash drive, memory circuitry, or other memory device. Storage 608 can store software 610 which is used in the operation of the processing node 600. Storage 608 may include a disk drive, flash drive, data storage circuitry, or some other memory apparatus. Software 610 may include computer programs, firmware, or some other form of machine-readable instructions, including an operating system, utilities, drivers, network interfaces, applications, or some other type of software. Processing system 606 may include a microprocessor and other circuitry to retrieve and execute software 610 from storage 608. Processing node 600 may further include other components such as a power management unit, a control interface unit, etc., which are omitted for clarity. Communication interface 602 permits processing node 600 to communicate with other network elements. User interface 604 permits the configuration and control of the operation of processing node 600.

Examples of processing node 600 include access nodes 104, 104A, 106, 106A, 206, 208, network node 110, gateway node 210, and controller node 212. Processing node 600 can also be an adjunct or component of a network element, such as an element of access nodes 104, 104A, 106, 106A, 206, 208, network node 110, gateway node 210, and controller node 212. Processing node 600 can also be another network element in a communication system. Further, the functionality of processing node 600 can be distributed over two or more network elements of a communication system.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention, and that various modifications may be made to the configuration and methodology of the exemplary embodiments disclosed herein without departing from the scope of the present teachings. Those skilled in the art also will appreciate that various features disclosed with respect to one exemplary embodiment herein may be used in combination with other exemplary embodiments with appropriate modifications, even if such combinations are not explicitly disclosed herein. As a result, the invention is not limited to the specific embodiments described above, but only by the following claims and their equivalents.

What is claimed is:

1. A method for triggering handoff of a wireless device, the method comprising:
    setting, at an access node, mobility handoff parameters for a plurality of wireless devices, the mobility handoff parameters being set based on a lower power class device operating in a coverage area of the access node;
    receiving, at the access node, a power report from at least one wireless device of the plurality of wireless devices;
    calculating a pathloss change for the at least one wireless device based on the received power report; and
    adjusting a handoff trigger point for the at least one wireless device based on the power report, calculated pathloss change, and mobility handoff parameters set based on the lower power class device.

2. The method of claim 1, wherein the at least one wireless device transmits at a higher maximum power output (MOP) than the lower power class device.

3. The method of claim 1, wherein the set mobility handoff parameters include a signal level threshold set based on signal strength indicators reported by the lower power class wireless device.

4. The method of claim 3, wherein the signal strength indicators include one or more of: reference Signal Received Power (RSRP), Received Signal Strength Indication (RSSI), Signal-to-Noise Ratio (SNR), Carrier-to-Noise Ratio (CNR) value, Signal Noise and Distortion (SNR), Signal to Interference (SII), Signal-to-Noise-Plus-Interference (SINR), and Signal to Quantization Noise Ratio (SQNR).

5. The method of claim 1, wherein the pathloss change is calculated based on a delta between a signal strength indicators and an uplink (UL) transmit power state of the at least one wireless device.

6. A method for extending a handoff trigger point of a wireless device, the method comprising:
    instructing at least one wireless device operating in a coverage area of an access node to report a power class at the access node;
    calculating, at the access node, a power class delta for the at least one wireless device, the power class delta being calculated based on a difference of the reported power class of the at least one wireless device and a power class of a lower power class wireless device operating in the coverage area;
    applying the calculated power class delta to a set mobility handoff parameter; and
    adjusting a handoff trigger point for the at least one wireless device based on the set mobility handoff parameter.

7. The method of claim 6, wherein the at least one wireless device is instructed to report its power class to the access node via an event-triggered report.

8. The method of claim 7, wherein the event-triggered report is triggered based on a signaling pathloss meeting a change threshold.

9. The method of claim 8, wherein the access node uses the event-triggered report to determine a difference between a nominal maximum output power level of the at least one wireless device and a current uplink (UL) transmit power state of the at least one wireless device.

10. The method of claim 8, wherein the event-triggered report is used by the access node to calculate the power class delta for the at least one wireless device.

11. The method of claim 6, wherein the handoff trigger point for the at least one wireless device is set at a power per power class delta value lower than a handoff trigger point for the lower power class wireless device.

12. The method of claim 6, wherein the at least one wireless device is instructed to report its power class to the access node via UE Capability reporting during an ATTACH procedure.

13. A system for extending a handoff trigger point of a wireless device, the system comprising:
    a processing node; and
    a processor coupled to the processing node, the processor for enabling the processing node to perform operations comprising:
        instructing at least one wireless device operating in a coverage area of an access node to report a power class at the access node;
        calculating, at the access node, a power class delta for the at least one wireless device, the power class delta being calculated based on a difference of the reported power class of the at least one wireless device and a power class of a lower power class wireless device operating in the coverage area;
        applying the calculated power class delta to a set mobility handoff parameter; and
        adjusting a handoff trigger point for the at least one wireless device based on the set mobility handoff parameter.

14. The system of claim 13, wherein the at least one wireless device is instructed to report its power class to the access node via an event-triggered report.

15. The system of claim 14, wherein the event-triggered report is triggered based on a signaling pathloss meeting a change threshold.

16. The system of claim 15, wherein the access node uses the event-triggered report to determine a difference between a nominal maximum output power level of the at least one wireless device and a current uplink (UL) transmit power state of the at least one wireless device.

17. The system of claim 15, wherein the event-triggered report is used by the access node to calculate the power class delta for the at least one wireless device.

18. The system of claim 13, wherein the handoff trigger point for the at least one wireless device is set at a power per power class delta value lower than a handoff trigger point for the lower power class wireless device.

19. The system of claim 13, wherein the at least one wireless device is instructed to report its power class to the access node via UE Capability reporting during an ATTACH procedure.

* * * * *